United States Patent [19]

Darton et al.

[11] Patent Number: 4,614,041
[45] Date of Patent: Sep. 30, 1986

[54] MAGNETIC ANGULAR POSITION SENSOR

[75] Inventors: Kenneth S. Darton, Bishops Stortford; Johnathan P. Larsen, Hitchin, both of United Kingdom

[73] Assignee: Standard Telephones and Cables Public Limited Company, London, England

[21] Appl. No.: 727,086

[22] Filed: Apr. 25, 1985

[30] Foreign Application Priority Data

Apr. 26, 1984 [GB] United Kingdom ............... 8410677

[51] Int. Cl.⁴ ............................................. G01C 19/38
[52] U.S. Cl. ........................................ 33/313; 33/327; 33/346; 33/356; 33/396
[58] Field of Search ................. 33/313, 366, 327, 345, 33/346, 355 R, 356, 363 Q, 378, 396, 397, 361, 319, 316, 352, 364

[56] References Cited

U.S. PATENT DOCUMENTS

| 3,262,080 | 7/1966 | Hubbard | 33/363 N |
| 3,286,358 | 11/1966 | Smokowski | 33/364 |
| 4,055,902 | 11/1977 | Jolley et al. | 33/356 |
| 4,250,626 | 2/1981 | Lazar | 33/363 R |
| 4,441,375 | 4/1984 | Minohara et al. | 33/327 |

FOREIGN PATENT DOCUMENTS 55-01606 8/1980 Japan ............................ 33/363 R Primary Examiner—Willis Little
Attorney, Agent, or Firm—Kerkam, Stowell, Kondracki & Clarke

[57] ABSTRACT

A magnetic angular position sensor having a ferrofluid filled spherical chamber in a cylindrical housing, within which floats a body comprising a buoyant core carrying a magnet which aligns itself and the body with the earth's magnetic field, and carrying an odd number of small permanent magnets. Hall effect devices are located in recesses in the ends of the housing. The housing also carries a calibration solenoid.

10 Claims, 3 Drawing Figures

MAGNETIC ANGULAR POSITION SENSOR

BACKGROUND OF THE INVENTION

This invention relates to a magnetic angular position sensor which may be used as a compass, an inclinometer or a proximity detector.

It is known to make a cheap compass, such as is sold as a car accessory, using a neutrally buoyant magnet assembly in a transparent compass chamber. The magnet assembly is traditionally combined with a compass card and the chamber is filled with a transparent fluid, e.g. alcohol. Because the compass card is floating freely in the chamber there is occasional friction between the card and the chamber wall.

More complex is the gimballed compass using a weighted mechanical system to hold a pivoted magnetic compass card horizontally regardless of the orientation of the outer casing. The position of the compass card is read using light sensors and an encoded disc and the positional information is relayed electrically to the outer casing, usually via slip-rings. Such a compass is an expensive item and is usually found in marine navigation apparatus.

There are also under development other compasses using the Sagnac effect in fibre optic loops.

SUMMARY OF THE INVENTION

According to the present invention there is provided a magnetic angular position sensor comprising a chamber, a body within said chamber, the chamber being otherwise filled with a ferrofluid, the body being provided with at least one pair of magnetic poles and having a substantially neutral buoyancy whereby the body floats centrally within the ferrofluid filled chamber, and a magnetic flux detection means attached to the exterior of the chamber responsive to changes in the magnetic flux caused by rotation of the body within the chamber.

BRIEF DESCRIPTION OF THE DRAWINGS

Embodiments of the invention will now be described with reference to the accompanying drawings, in which.

DESCRIPTION OF THE PREFERRED EMBODIMENTS

Figure 1:
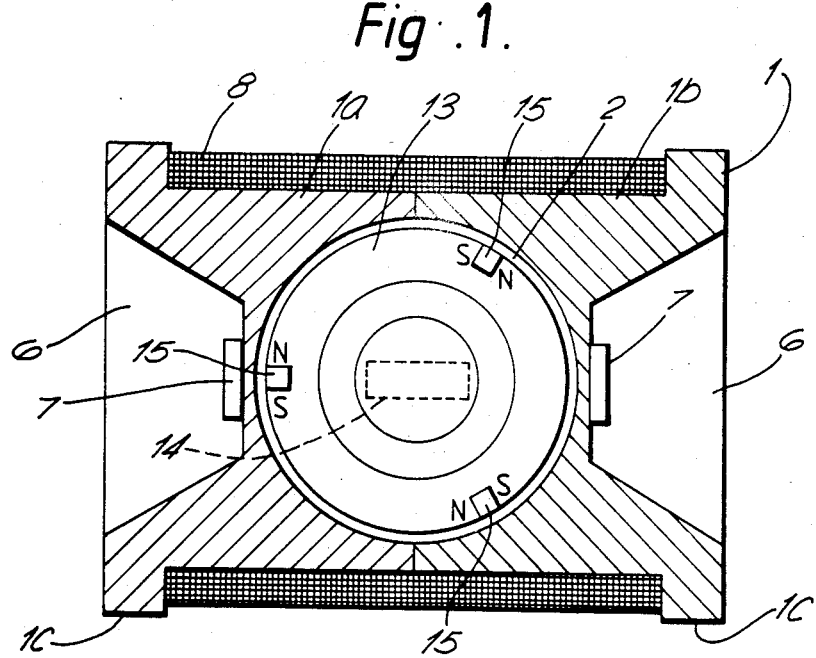
FIG. 1 illustrates a plan view section through a magnetic angular position sensor in accordance with the invention.

The sensor shown in FIG. 1 comprises a housing 1 constructed of two substantially cylindrical portions 1a, 1b of plastics material which are bonded together to form a spherical chamber 2. Inside the chamber 2 is a composite body comprising a substantially spherical positively buoyant core 13, as of plastics material incorporating glass microspheres. The core is weighted on its underside with a permanent magnet 14, which acts as a ballast, so that when the chamber is filled with a ferrofluid the body will be neutrally buoyant and will float centrally in the chamber. The ends of the cylindrical portions 1a, 1b have recesses 6 which allow for a thin wall section between the recesses and the chamber. At least one, and preferably both, of the recesses is provided with a Hall effect magnetic flux detector 7 attached to the thin wall section. Spaced asymmetrically and equi-angularly around the core are an odd number of small magnets 15, magnetised with their poles horizontally aligned. With an odd number of magnets, e.g., 3, ambiguities in the electrical outputs from the Hall effect devices can be resolved as the housing rotates relative to the composite body.

Normally the buoyant body will float with the magnet 14 in a horizontal plane and with the magnetic poles of magnet 14 aligned with the earth's magnetic field. If the Hall effect devices are on a horizontal axis, any rotation of the housing about a vertical axis (normal to the plane of the drawing) will result in relative movement between the poles of the magnets 15 and the Hall effect devices. Electrical outputs can thus be derived representing the degree of rotation of the housing, the sensor thus acting as a compass. Note that with the spherical chamber and the part spherical contour of the body with the small magnets 15 distributed horizontally around the body, limited tilting of the axis passing through the Hall effect devices will not affect the output. Similarly, rotation of the housing about this axis will not affect the outputs. In marine terms, if the housing is aligned with the major axis of a ship, pitching and rolling will not affect the output.

In order to calibrate the sensor the housing 1 is formed with end flanges 1c defining a bobbin on which a calibration solenoid 8 can be wound.

If the magnetic poles to which the Hall effect devices respond are arranged on a vertical circumference of the buoyant body instead of a horizontal circumference as shown in FIG. 1 then the sensor can be used as an inclinometer. Furthermore, whichever orientation is used, the sensor can operate as a proximity detector responsive to any magnetic field, e.g. that of a car, which passes close to the sensor.

If the composite body is carried within a housing provided with three orthogonally placed Hall effect devices the sensor becomes a 3-axis sensor, responsive to yaw, roll and pitch.

Figure 2:
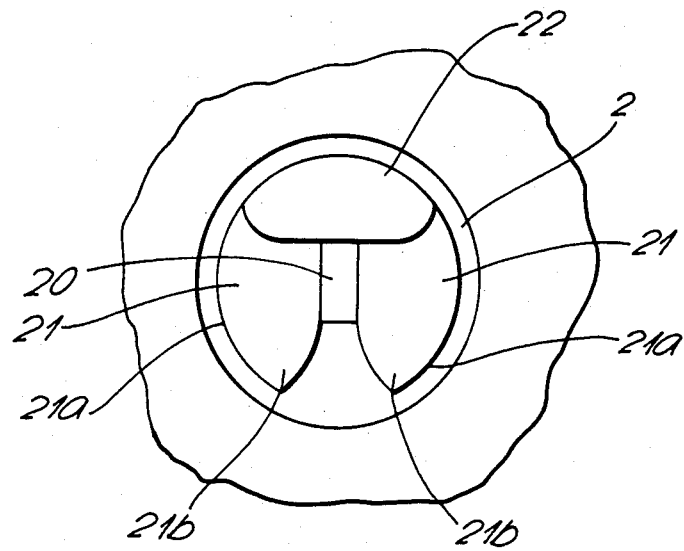
FIGS. 2 and 3 illustrate another form of buoyant magnetic body for a magnetic angular position sensor.
Figure 3:
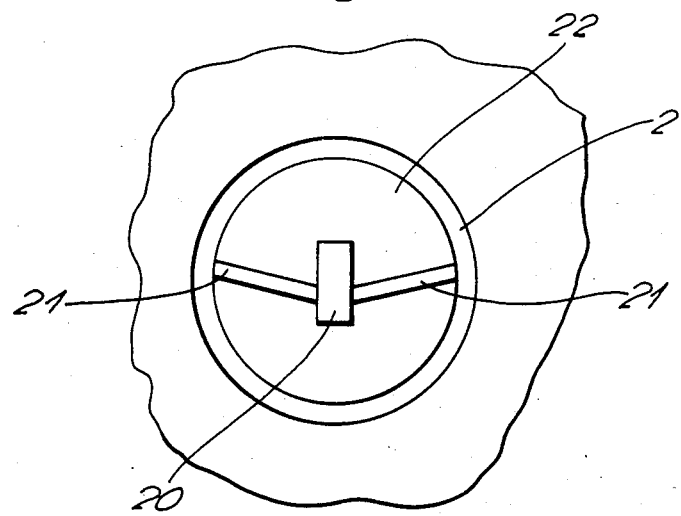

Another magnetic structure which may be used is shown in FIGS. 2 and 3. A small magnet 20 has soft iron flux concentrators 21 attached to each magnetic pole. These concentrators take the form of "butterfly wings" and are shaped so that the outer edges 21a conform closely to the chamber wall 2. The magnetic assembly is affixed to the underside of a positively buoyant body 22. The lower portions 21b of the concentrator wings may descend below the magnet to act as ballast weights. It may be advantageous to angle the wings with respect to the magnet axis, as shown in the plan view of FIG. 4, to provide a magnetic asymmetry. This is useful in that it allows the associated external electronic circuitry to be designed to eliminate ambiguities in the output signals as the casing rotates relative to the magnetic structure.

We claim:

1. A magnetic angular position sensor comprising a housing having a chamber therein; a ballasted body within the chamber, the chamber being filled with a ferrofluid, the body having a pair of magnetic poles and having a substantial neutral buoyancy so that the body floats centrally within the ferrofluid filled chamber with the magnetic poles aligned with the earth's magnetic field; magnetic flux detection means attached to the housing at the exterior of the chamber; and magnetic flux producing means asymmetrically disposed on the body for interacting with the flux detection means such that the flux detection means is responsive to relative rotation of the body and the housing about an axis passing through the body.

2. A sensor according to claim 1 wherein the magnetic flux detection means comprises a Hall effect device.

3. A sensor according to claim 1 comprising two magnetic flux detection means disposed diametrically with respect to the chamber.

4. A sensor according to claim 1 wherein the chamber is spherical.

5. A sensor according to claim 1, wherein the neutrally buoyant body comprises a core of positively buoyant non-magnetic material carrying one or more permanent magnets, said magnets comprising said magnetic flux producing means.

6. A sensor according to claim 5 wherein the positive buoyancy material is a plastics material incorporating glass microspheres.

7. A sensor according to claim 5, wherein the positively buoyant core carries an odd number of permanent magnets equi-angularly spaced around the circumference of the core and the body carries a further permanent magnet centrally placed with respect to the odd number of magnets, said further magnet being arranged to act as a ballast weight and providing said magnetic poles to align the body carrying the odd number of magnets with the earth's magnetic field.

8. A sensor according to claim 5 wherein the positively buoyant core carries a centrally mounted permanent magnet to which are attached flux concentrators extending on either side of said centrally mounted magnet asymmetrically towards the inner surface of the chamber.

9. A sensor according to claim 1 wherein the chamber is spherical and is formed in a cylindrical housing the axis of which passes through the flux detection means, the housing carrying a solenoid surrounding the chamber and aligned with said housing axis.

10. A sensor according to claim 1 comprising three flux detection means positioned orthogonally with respect to the housing whereby the sensor is responsive to 3-axis motion.

* * * * *